3,482,015
AEROSOL COMPOSITION OF PHENYLEPHRINE TARTRATE AND THE PRODUCTION OF SUCH TARTRATE
Frederick W. Bollinger, Westfield, N.J., Joel B. Portnoff, Philadelphia, Pa., and Alan J. Davidson, Matawan, N.J., assignors to Merck & Co., Inc., Rahway, N.J., a corporation of New Jersey
No Drawing. Filed Feb. 8, 1965, Ser. No. 431,164
Int. Cl. A61k 13/00; C07c 91/34
U.S. Cl. 424—45          2 Claims This invention pertains to nasal spray preparations and more particularly to an aerosol composition comprising a phenylephrine salt adapted for use in aerosol preparation intended for nasal sprays or for inhalation therapy.

In the preparation of aerosol suspensions for use in nasal sprays or inhalation therapy, it is desirable that the aerosol be comprised essentially of the desired therapeutic ingredients and the halohydrocarbon propellant. It is generally undesirable to prepare aerosol formulations where other agents must be added to the composition to achieve a suspension of the therapeutic ingredients in the halohydrocarbon. When the active ingredient(s) are not readily soluble and/or stable in the concentration desired in the propellant system, the aerosol compositions must contain and maintain the active ingredients in particulate form in suspension in the propellant carrier to achieve the desired degree of effectiveness in use as an aerosol. In the past a satisfactory suspension of phenylephrine salts has only been achieved by the addition of surfactants to the therapeutic aerosol composition.

It is therefore an object of this invention to provide an aerosol composition comprising a phenylephrine salt adapted for nasal sprays or for inhalation therapy which does not require the addition of surfactants to achieve and maintain a uniform particulate suspension of the active ingredients of the aerosol composition in the halohydrocarbon propellant carrier.

It is a further object of this invention to provide an aerosol composition consisting essentially of a steroid and a phenylephrine salt in a halohydrocarbon propellant carrier.

Still a further object of this invention is to provide a method for performing aerosol spray applications with a steroid or other therapeutic ingredients and a phenylephrine salt where a uniform particle size suspension of active ingredient is applied in aeroseol form without the aid of surfactant materials.

It has been discovered that L(−)-phenylephrine L(+)-tartrate when milled in ethanol and suspended in a halohydrocarbon carrier containing a steroid such as dexamethasone, uniquely achieves the objects and advantages of an aerosol useful for nasal sprays or inhalation therapy without the aid of surfactant materials.

Salts of phenylephrine which are soluble in ethanol are not suitable for use in this invention. This solubility prevents the maintenance of proper particle sizes when the salts are milled in ethanol and permits larger aggregates to form on standing because ethanol provides a reaction medium for dexamethasone phosphate or dexamethasone phosphoric acid and the soluble phenylephrine salt. These conditions combine to produce an incompatability of these ingredients upon dilution with a halohydrocarbon propellant carrier thereby preventing the formation of a proper aerosol. Where ethanol is eliminated from this system the above disadvantages are not encountered. However, a surfactant material must be added to the therapeutic ingredients and propellant carrier to form a suspension of the proper uniformity of an aerosol spray.

The phenylephrine tartrate salt which produces the aforementioned advantages in an aerosol spray composition for inhalation therapy can be prepared in the following manner.

L(−)-phenylephrine was reacted with L(+)-tartaric acid according to the equation:

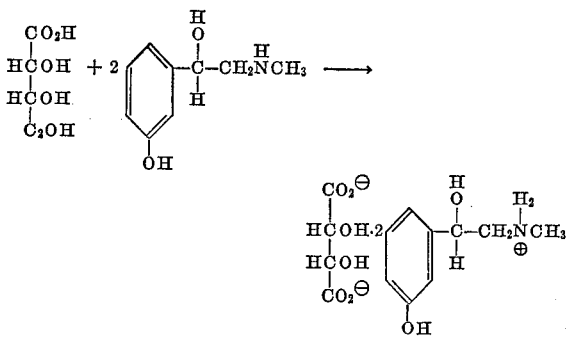

A solution of 550 ml. of absolute ethanol, 25 ml. of water and 25 g. (0.1493 mole) L(−)-phenylephrine was prepared by dissolving the phenylephrine in the water and ethanol with heating. Similarly 11.2 g. (0.0747 mole) of L(+)-tartaric acid was dissolved in 35 ml. of absolute ethanol. Both solutions were filtered while hot and then mixed together.

The mixture was allowed to stand for complete crystallization and the product was then separated from the mixture by filtration, washed with small portions of cold absolute ethanol and then dried under vacuum at 40° C. Analysis confirmed the formation of the desired product in a yield of 93.6% of theoretical.

In the preparation of an aerosol according to this invention the L(−)-phenylephrine L(+)-tartrate prepared as above is milled in ethanol to form a suspension of solids of a desired particle size in concentrated form and this suspension is resuspended in a halohydrocarbon propellant system.

The following are examples of aerosol compositions which can be employed according to this invention.

EXAMPLE 1

| | G. |
|---|---|
| Dexamethasone phosphate | 0.023 |
| L(−)-phenylephrine L(+)-tartrate | 0.048 |
| Ethanol, absolute | 0.420–0.700 |
| "Freon" 12 and 114 (20/80) q.s. | 14.0 |

EXAMPLE 2

| | |
|---|---|
| Dexamethasone phosphate | 0.023 |
| L(−)-phenylephrine L(+)-tartrate | 0.048 |
| dl-Isoproterenol sulfate | 0.020 |
| Ethanol, absolute | 0.420–0.700 |
| "Freon" 12 and 114 (20/80) q.s. | 14.0 |

EXAMPLE 3

| | |
|---|---|
| L(−)-phenylephrine L(+)-tartrate | 0.048 |
| Ethanol, absolute | 0.420–0.700 |
| "Freon" 12 and 114 (20/80) q.s. | 14.0 |

EXAMPLE 4

| | |
|---|---|
| L(−)-phenylephrine L(+)-tartrate | 0.048 |
| dl-Isoproterenol sulfate | 0.020–0.700 |
| Ethanol, absolute | 0.420–0.700 |
| "Freeon" 12 and 114 (20/80) q.s. | 14.0 |

Medicaments other than steroids can be utilized in the aerosol of this invention. For example dl-isoproterenol sulfate is a well-known bronchodilating agent. Since L(−)-phenylephrine L(+)-tartrate has exceedingly limited solubility in ethanol it has wide application in aerosol preparations where the other constituents of the composition do not react with the solid particles of the phenylephrine salt and are otherwise suitable for use in aerosol application from a suspension in a halohydrocarbon.

"Freon" 12 and "Freon" 114 utilized in the composition as the propellant carrier for the active medicinal ingredients are well known halohydrocarbons. "Freon" 12 is dichlorodifluoromethane and "Freon" 114 is 1,2-dichloro-1,1,2,2-tetrafluoroethane. These two halohydrocarbons are preferably mixed in a 20%–80% ratio respectively to achieve their best utilization as a unitary propellant carrier.

It should be readily appreciated that the invention of a new composition and method for nasal sprays or inhalation therapy is not limited to the preferred examples disclosed herein but has very broad application to aerosol compositions and methods generally where it is desired to incorporate a phenylephrine derivative into the particular composition or method.

What is claimed is:
1. The method of making an aerosol composition for medicinal use comprising milling L(−)-phenylephrine L(+)-tartrate in absolute ethanol in the weight ratio of 0.048 to 0.420–0.700 to thereby obtain a slurry and suspending it in a propellant mixture of 20% dichlorodifluoromethane and 80% 1,2-dichloro-1,1,2,2-tetrafluoroethane to thereby obtain a suspension.

2. The suspension as prepared according to the process of claim 1.

References Cited

UNITED STATES PATENTS

| | | | |
|---|---|---|---|
| 3,219,533 | 11/1965 | Mullins | 167—82 |
| 3,320,125 | 5/1967 | Grim | 424—45 |
| 3,322,625 | 5/1967 | Shimmin | 424—45 |

OTHER REFERENCES

Shepherd; "Aerosols," Science and Technology, Interscience, New York (1961), p. 404.

ALBERT T. MEYERS, Primary Examiner

S. J. FRIEDMAN, Assistant Examiner

U.S. Cl. X.R.

424—330